United States Patent
Ishikawa et al.

(10) Patent No.: US 7,707,688 B2
(45) Date of Patent: May 4, 2010

(54) OPENING AND CLOSING MECHANISM

(75) Inventors: Takayuki Ishikawa, Fukui (JP); Takehiko Konja, Fukui (JP)

(73) Assignee: Panasonic Corporation, Osaka (JP)

( * ) Notice: Subject to any disclaimer, the term of this patent is extended or adjusted under 35 U.S.C. 154(b) by 589 days.

(21) Appl. No.: 11/710,513

(22) Filed: Feb. 26, 2007

(65) Prior Publication Data

US 2007/0271734 A1 Nov. 29, 2007

(30) Foreign Application Priority Data

Mar. 31, 2006 (JP) .............................. 2006-098835

(51) Int. Cl.
E05F 1/08 (2006.01)
(52) U.S. Cl. ......................................... 16/303; 16/273
(58) Field of Classification Search ................ 16/330, 16/303, 273, 276; 379/433.12, 433.13; 455/575.1, 455/575.3, 575.4, 575.8, 550.1, 90.3
See application file for complete search history.

(56) References Cited

U.S. PATENT DOCUMENTS

| | | | |
|---|---|---|---|
| 5,937,482 A * | 8/1999 | Horng ......................... 16/340 |
| 7,085,375 B2 * | 8/2006 | Katoh ..................... 379/433.13 |
| 7,168,136 B2 * | 1/2007 | Gan ............................. 16/367 |
| 7,213,301 B2 * | 5/2007 | Sakai et al. .................... 16/303 |
| 7,543,357 B2 * | 6/2009 | Ishikawa et al. ............... 16/303 |
| 7,578,030 B2 * | 8/2009 | Duan et al. ..................... 16/330 |
| 2004/0216275 A1* | 11/2004 | Hayashi ....................... 16/303 |
| 2005/0115813 A1 | 6/2005 | Sakai et al. |
| 2005/0138771 A1* | 6/2005 | Su ............................... 16/330 |
| 2007/0245523 A1* | 10/2007 | Yang ........................... 16/330 |

FOREIGN PATENT DOCUMENTS

| | | |
|---|---|---|
| CN | 2570927 | 9/2003 |
| CN | 1624344 | 6/2005 |
| JP | 2005-346992 | 12/2005 |

OTHER PUBLICATIONS

Chinese Office Action issued Nov. 28, 2008 (with English translation) in a Chinese application that is a foreign counterpart to the present application.

* cited by examiner

*Primary Examiner*—Chuck Y. Mah
(74) *Attorney, Agent, or Firm*—Wenderoth, Lind & Ponack, L.L.P.

(57) ABSTRACT

A sliding member held by a movable case is interposed between the movable case and a stopper plate. During opening and closing operations, the movable case does not wear because the stopper plate and the sliding member slidably contact.

2 Claims, 5 Drawing Sheets

OPENING AND CLOSING MECHANISM

BACKGROUND OF THE INVENTION

1. Field of the Invention

The present invention relates to opening and closing mechanisms used in hinge joints of electronic devices adopting a folding design such as mobile phones.

2. Background Art

FIG. 6 is a sectional view of conventional opening and closing mechanism 30, and FIG. 7 is its exploded perspective view. Fixed member 31 has fixed cam 32 with sloped portions 32B and 32C.

Movable member 33 is disposed in a rotatable fashion and also axially-movable fashion relative to fixed member 31. Movable member 33 has a pair of movable cams 34 which engage with cam 32.

Fixed member 31, movable member 33, spring 36, and fixed shaft 37 are housed in cylindrical movable case 35 made of a metal sheet. Movable member 33 and movable case 35 are coupled via spring 36. Each of the tips of cams 34 is resiliently contacted against sloped portion 32B of cam 32 by the force of spring 36.

Fixed member 31 is secured to a left end of fixed shaft 37. Movable member 33 and movable case 35 are rotatably installed on fixed shaft 37. A right end of fixed shaft 37 protrudes outward from movable case 35. Ring-shaped stopper plate 38 made of metal is secured to the right end of fixed shaft 37 so as to retain movable case 35, configuring opening and closing mechanism 30.

This opening and closing mechanism 30 is, for example, employed in a hinge joint of a folding mobile phone as shown in FIG. 8. Though not illustrated in FIG. 8, opening and closing mechanism 30 acts as a hinge between fixed housing 42 and movable housing 43 by coupling fixed member 31 to fixed housing 42, and movable case 35 to movable housing 43, respectively.

In the above structure, a force in a closing direction is applied to movable member 33 when each of the tips of movable cams 34 is resiliently contacting sloped portion 32B of fixed cam 32, as shown in FIG. 6, and thus the force in the closing direction relative to fixed housing 42 is applied to movable housing 43.

When movable housing 43 is opened by hand from this closed state, movable case 35 coupled to movable housing 43 rotates, and each of the tips of movable cams 34 rides over a tip of fixed cam 32, and resiliently contacts sloped portion 32C. Now, a force in an opening direction is applied to movable member 33, and thus the force in the opening direction relative to fixed housing 42 is applied to movable housing 43.

Movable case 35 is pressed against stopper plate 38 by a counteraction of the force of spring 36 toward movable member 33. Accordingly, a friction occurs between movable case 35 and stopper plate 38 when movable housing 43 is opened and closed, as described above.

Stopper plate 38 is made by punching out a relatively hard metal sheet. On the other hand, movable case 35 is made by drawing a relatively soft metal sheet. Accordingly, movable case 35 wears and a smooth operation feeling is degraded on repeating opening and closing operations.

One prior art device related to the present invention is disclosed in Japanese Patent Unexamined Publication No. 2005-346992.

SUMMARY OF THE INVENTION

An opening and closing mechanism of the present invention disposes a sliding member held by a movable case between the movable case and a stopper plate. During opening and closing operations, the movable case does not wear because the sliding member slidably contacts the stopper plate. Since the sliding member is made of metal with the same hardness as that of the stopper plate, the sliding member and the stopper plate wear evenly after the repeated opening and closing operations over a long period of time. Accordingly, the present invention ensures reliable opening and closing operations with a smooth operational feeling.

DETAILED DESCRIPTION OF THE INVENTION

An exemplary embodiment of the present invention is described below with reference to FIGS. 1 to 5. The drawings are radially enlarged for easier understanding of the relation between a fixed cam and a movable cam.

Figure 1:
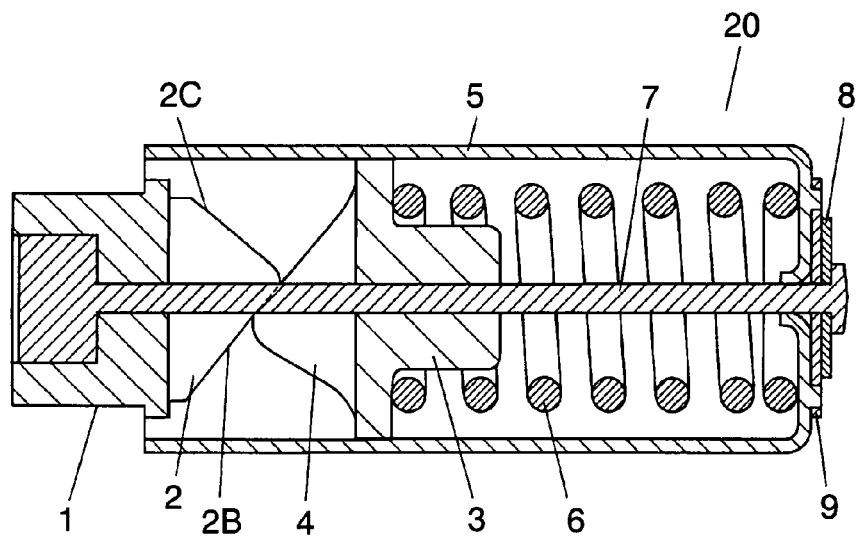
FIG. 1 is a sectional view of an opening and closing mechanism in accordance with an embodiment of the present invention.
Figure 2:
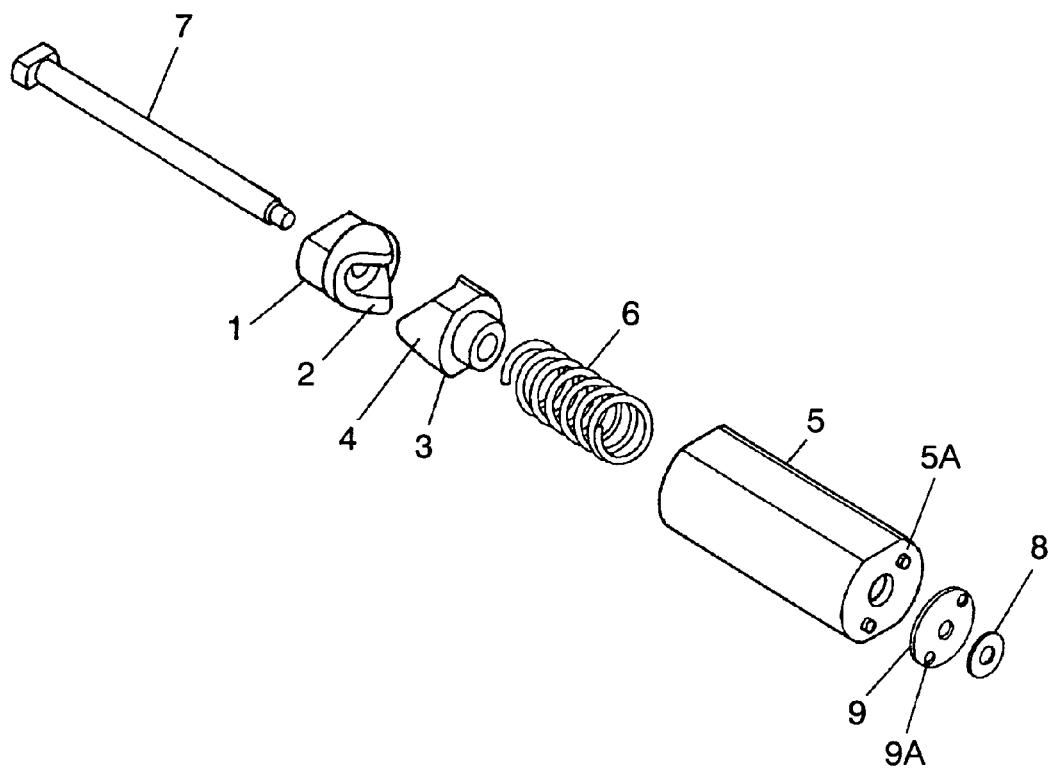
FIG. 2 is an exploded perspective view of the opening and closing mechanism in accordance with the embodiment of the present invention.

FIG. 1 is a sectional view and FIG. 2 is an exploded perspective view of opening and closing mechanism 20 of the present invention. Fixed member 1 made of metal has fixed cam 2 with sloped portions 2B and 2C. Movable member 3 made of metal is disposed in a rotatable fashion and also in an axially-movable fashion relative to fixed member 1. Movable member 3 has a pair of movable cams 4 which engage with fixed cam 2.

Cylindrical movable case 5 made of a metal sheet houses fixed member 1, movable member 3, spring 6, and fixed shaft 7. Movable member 3 and movable case 5 are coupled via spring 6. A force of spring 6 makes each of the tips of movable cams 4 resiliently contact sloped portion 2B of fixed cam 2.

Fixed member 1 is secured to a left end of fixed shaft 7. Movable member 3 and movable case 5 are rotatably installed on fixed shaft 7. A right end of fixed shaft 7 protrudes outward from movable case 5. Ring-shaped stopper plate 8 made of metal, such as stainless steel, is secured to the right end of fixed shaft 7 so as to retain movable case 5.

Ring-shaped sliding member 9 is interposed between movable case 5 and stopper plate 8. Sliding member 9 is held by movable case 5 by fitting protrusion 5A of movable case 5 into hole 9A. This configures opening and closing mechanism 20.

Figure 3:
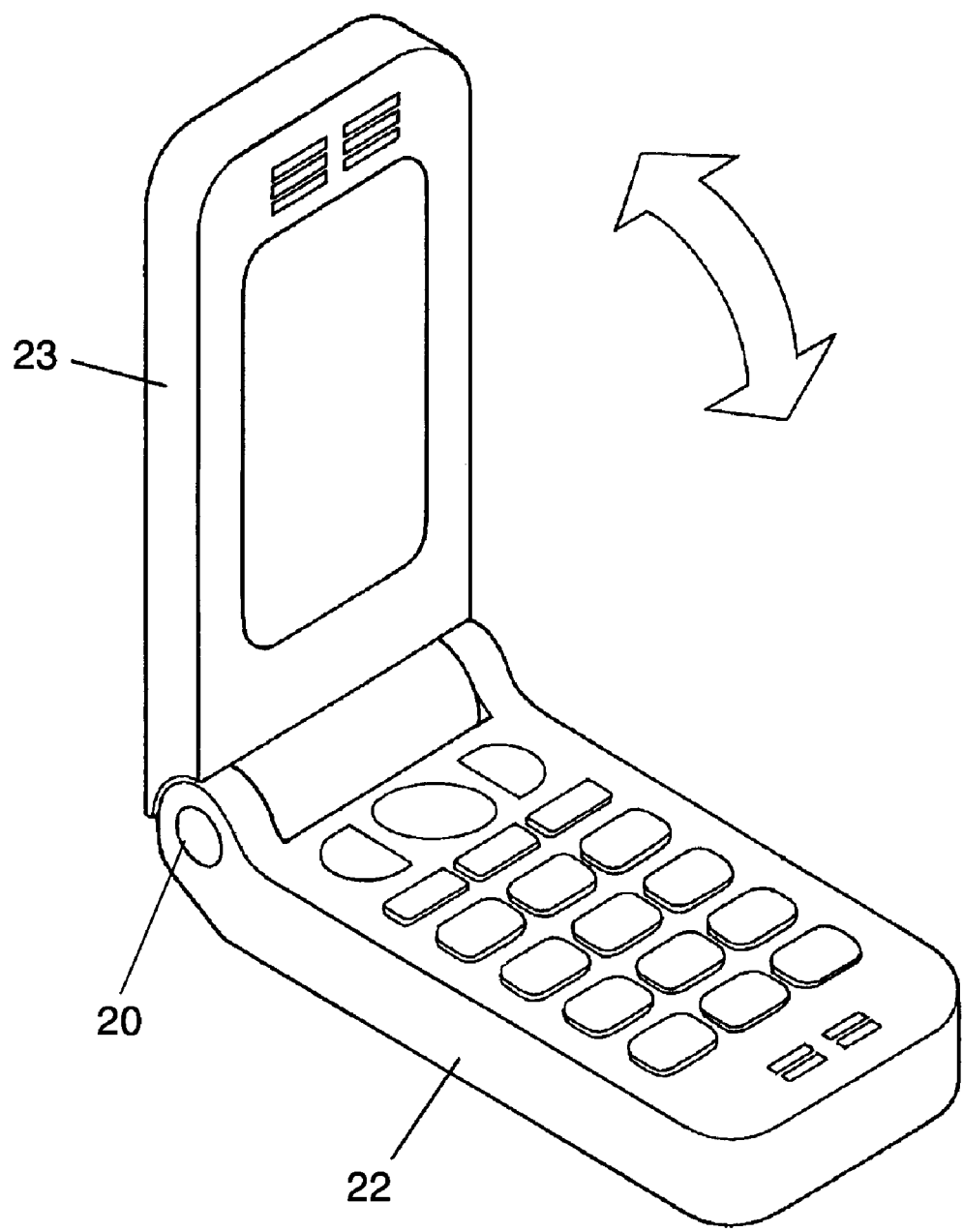
FIG. 3 is a perspective view of a mobile phone employing the opening and closing mechanism of the present invention.

This opening and closing mechanism 20 is, for example, employed in a hinge joint of a mobile phone shown in FIG. 3. Though not illustrated in FIG. 3, opening and closing mechanism 20 acts as a hinge between fixed housing 22 and movable housing 23 by coupling fixed member 1 to fixed housing 22, and movable case 5 to movable housing 23, respectively.

In the above structure, a force in a closing direction is applied to movable member 3 when each of the tips of movable cams 4 is resiliently contacting sloped portion 2B of fixed cam 2, as shown in FIG. 1, and thus the force in the closing direction relative to fixed housing 22 is applied to movable housing 23.

When movable housing 23 is opened by hand from this closed state, movable case 5 coupled to movable housing 23 rotates, and each of the tips of movable cams 4 rides over the tip of fixed cam 2, and resiliently contacts sloped portion 2C. Now, a force in an opening direction is applied to movable member 3, and thus the force in the opening direction relative to fixed housing 22 is applied to movable housing 23.

Movable case 5 is pressed against stopper plate 8 by a counteraction of the force of spring 6 toward movable member 3. Sliding member 9 is thus pressed against stopper plate 8.

Since sliding member 9 is held by movable case 5, sliding member 9 co-rotates with movable case 5. Accordingly, when movable housing 23 is opened and closed as described above, sliding member 9 and stopper plate 8 slidably contact.

Since sliding member 9 is made of metal with the same hardness as that of stopper plate 8, such as stainless steel, sliding member 9 and stopper plate 8 wear evenly. Accordingly, reliable opening and closing operations with a smooth operational feeling are achievable even after repeated opening and closing operations over a long period of time.

Figure 4:
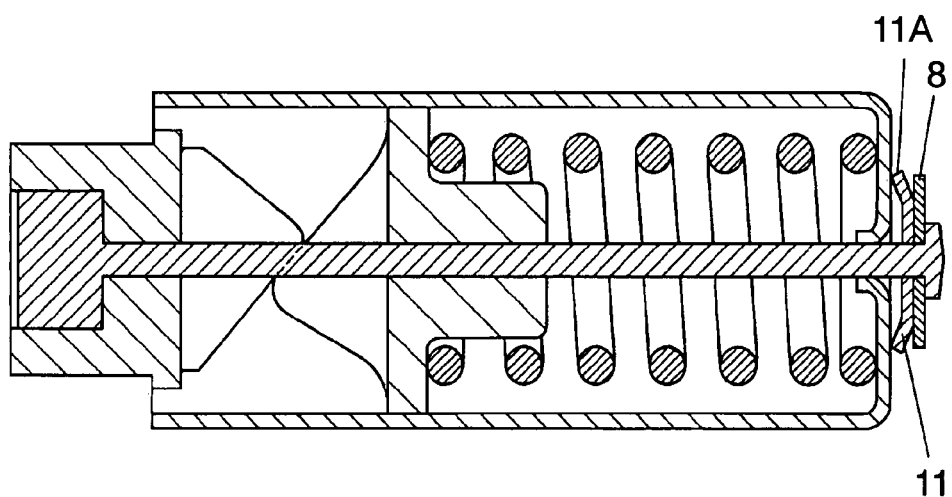
FIG. 4 is a sectional view of another type of a sliding member.
Figure 5:
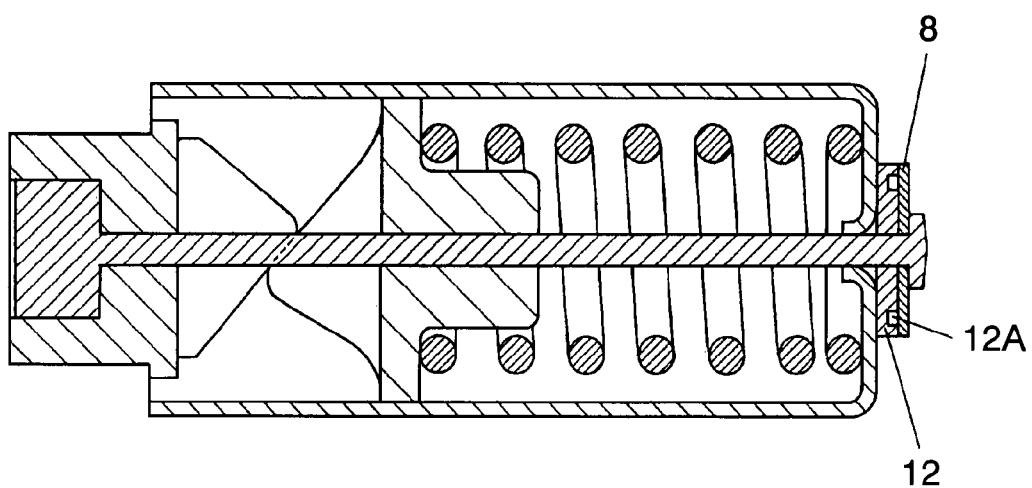
FIG. 5 is a sectional view of still another type of a sliding member.
Figure 6:
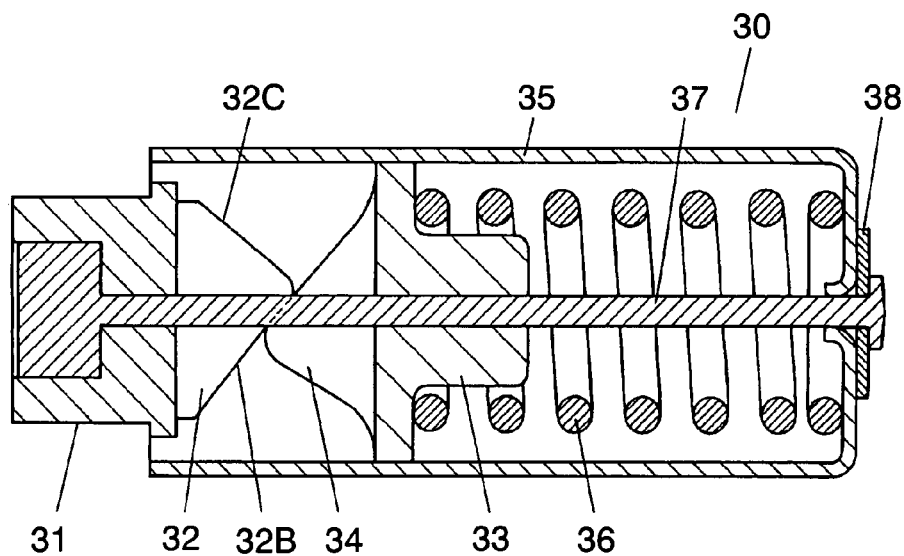
FIG. 6 is a sectional view of a conventional opening and closing mechanism.
Figure 7:
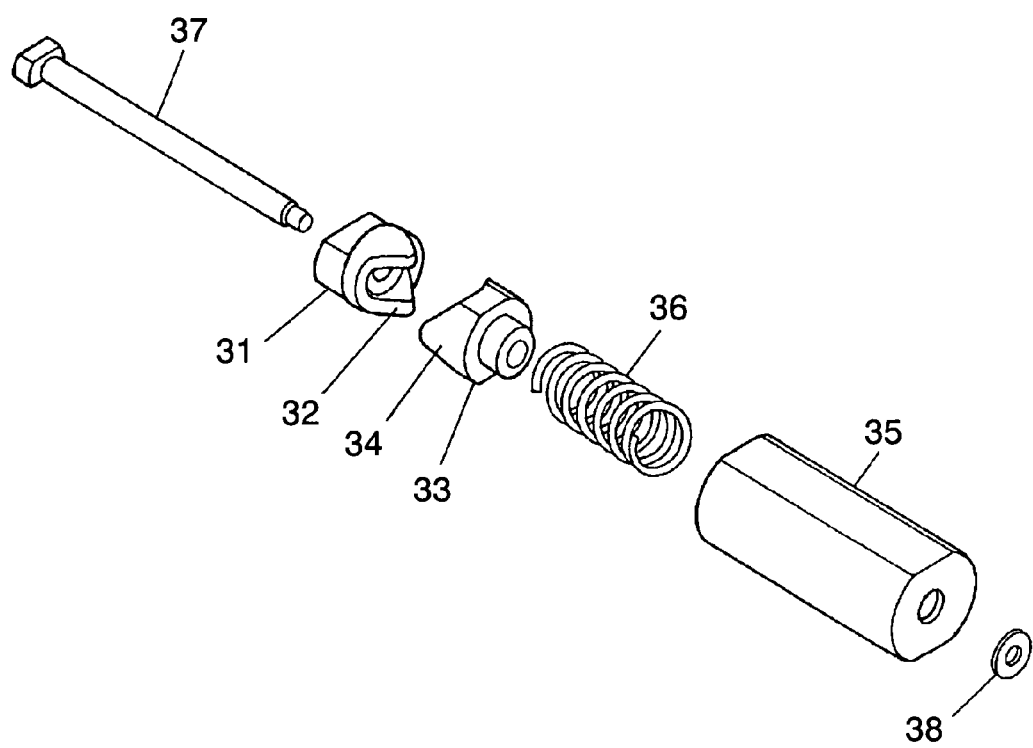
FIG. 7 is an exploded perspective view of the conventional opening and closing mechanism.
Figure 8:
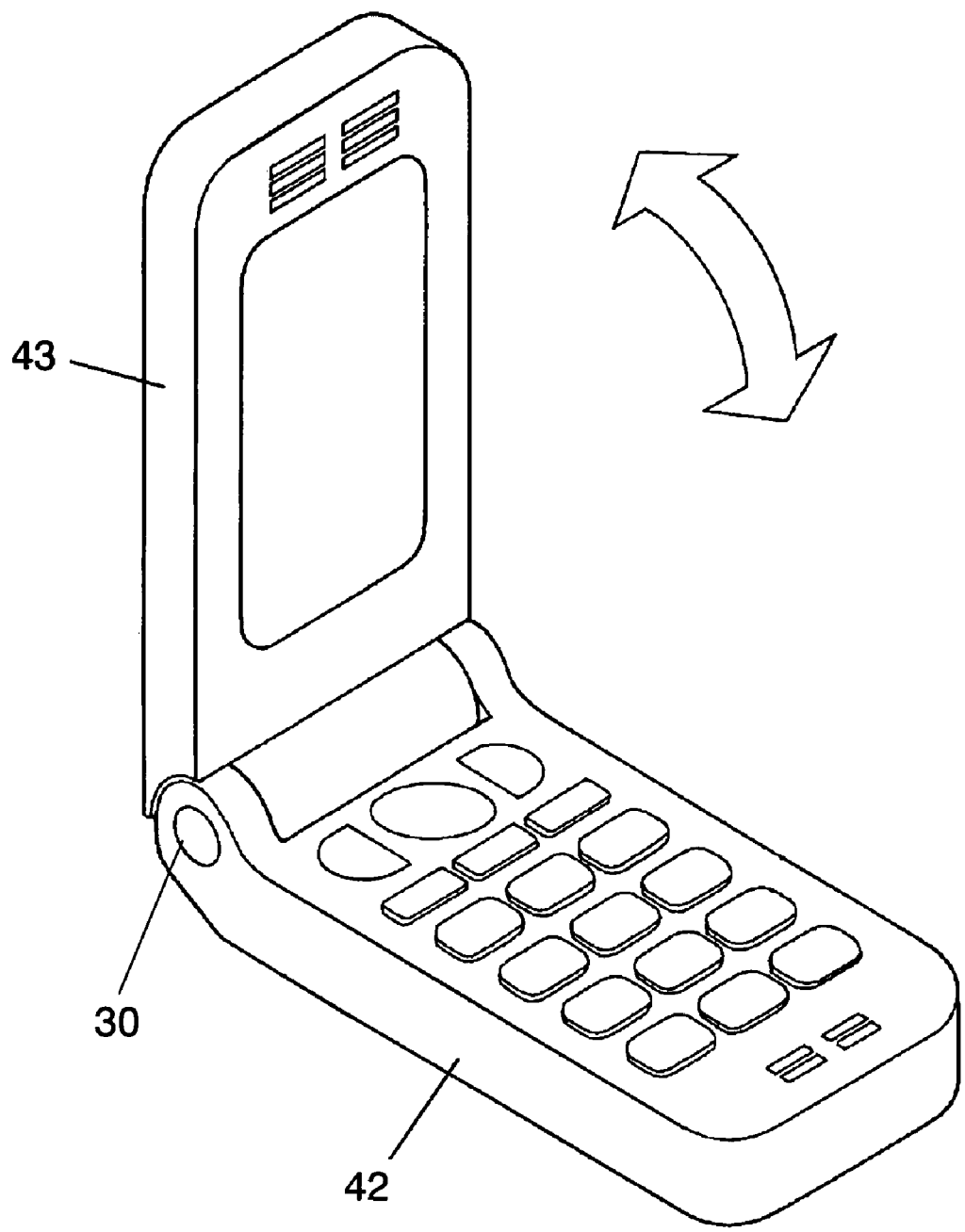
FIG. 8 is a perspective view of a mobile phone employing the conventional opening and closing mechanism.

FIGS. 4 and 5 show sliding members different from sliding member 9. Sliding member 11 in FIG. 4 co-rotates with movable case 5 by making a tip of bent portion 11A bite into movable case 5.

Sliding member 12 in FIG. 5 co-rotates with movable case 5 by applying a lubricant in groove 12A so as to reduce friction between sliding member 12 and stopper plate 8.

Accordingly, the opening and closing mechanism of the present invention ensures reliable opening and closing operations with a smooth operational feeling for a long period of time, and thus is applicable to a range of electronic devices.

What is claimed is:

1. An opening and closing mechanism for a folding electronic device, comprising:
    a fixed member including a fixed cam;
    a movable member including a movable cam, the movable cam engaging with the fixed cam;
    a spring for pressing the movable member against the fixed member;
    a cylindrical movable case housing the fixed member, the movable member, and the spring;
    a fixed shaft on which the movable member and the movable case are rotatably installed, the fixed member being secured to a first end of the fixed shaft, a second end of the fixed shaft protruding outward from an end face of the movable case;
    a stopper plate secured to the second end of the fixed shaft, the stopper plate retaining the movable case; and
    a sliding member interposed between the end face of the movable case and the stopper plate, the sliding member being held by the movable case;
    wherein the sliding member is arranged to slide on the stopper plate upon rotation of the movable case relative to the fixed shaft; and
    wherein the sliding member has a same hardness as the stopper plate.

2. The opening and closing mechanism according to claim 1, wherein
    the stopper plate has a surface slidable on the sliding member; and
    the surface of the stopper plate has a groove provided therein, the groove facing the sliding member and having lubricant applied thereto.

* * * * *